(12) United States Patent
Keen et al.

(10) Patent No.: US 8,630,294 B1
(45) Date of Patent: Jan. 14, 2014

(54) DYNAMIC BYPASS MECHANISM TO ALLEVIATE BLOOM FILTER BANK CONTENTION

(75) Inventors: John Keen, Mountain View, CA (US); Jianhui Huang, Fremont, CA (US); Deepak Goel, Sunnyvale, CA (US); David R. Skinner, Los Altos, CA (US); Venkatasubramanian Swaminathan, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 299 days.

(21) Appl. No.: 13/239,915

(22) Filed: Sep. 22, 2011

Related U.S. Application Data (60) Provisional application No. 61/485,074, filed on May 11, 2011, provisional application No. 61/485,079, filed on May 11, 2011.

(51) Int. Cl.
*H04L 12/28* (2006.01)

(52) U.S. Cl.
USPC ...... 370/392; 370/252; 370/389; 370/395.32; 707/796; 711/103; 711/167; 711/216

(58) Field of Classification Search
USPC .............. 370/389, 392, 395.32, 428; 707/796
See application file for complete search history.

(56) References Cited

U.S. PATENT DOCUMENTS

| 6,768,739 B1 * | 7/2004 | Kobayashi et al. ........... 370/392 |
| 8,005,868 B2 * | 8/2011 | Saborit et al. ................. 707/796 |
| 8,018,940 B2 * | 9/2011 | Hao et al. ...................... 370/392 |
| 2001/0028651 A1 | 10/2001 | Murase |
| 2005/0195832 A1 | 9/2005 | Dharmapurikar et al. |
| 2009/0182726 A1 * | 7/2009 | Wang ................................. 707/5 |
| 2009/0228433 A1 * | 9/2009 | Aguilar Saborit et al. ....... 707/2 |
| 2010/0098081 A1 * | 4/2010 | Dharmapurikar et al. .... 370/392 |
| 2010/0284405 A1 * | 11/2010 | Lim .............................. 370/392 |

FOREIGN PATENT DOCUMENTS

WO 02076042 A1 9/2002

OTHER PUBLICATIONS

U.S. Appl. No. 13/239,774, by John Keen, filed Sep. 22, 2011.
Berenbrink et al., "Balanced Allocations: The Heavily Loaded Case," SIAM J. Comput. vol. 35 No. 6, pp. 1350-1385, Aug. 2005.
Kirsch et al., "More Robust Hashing: Cuckoo Hashing With a Stash," Siam J. Comput., vol. 39, 4, pp. 1543-1561, Oct. 2009.
Pagh et al., "Cuckoo Hashing," Preprint submitted to Elsevier Science Dec. 8, 2003, 27 pp.

(Continued)

*Primary Examiner* — Andrew Chriss
*Assistant Examiner* — Mohamed Kamara
(74) *Attorney, Agent, or Firm* — Shumaker & Sieffert, P.A.

(57) ABSTRACT

An example computing device includes a prefix lookup module, and a Bloom filter that includes a set of queues. The prefix lookup module is configured to receive policy configuration information, examine a state of a queue of the set of queues, and determine whether to bypass the first Bloom filter based on the policy configuration information and the state of the queue. In one example, the prefix lookup module may be configured to, using the policy configuration information, determine to bypass the Bloom filter when the queue is full. In another example, the prefix lookup module may be configured to, using the policy configuration information, determine not to bypass the Bloom filter and send a lookup request to the Bloom filter upon determining that the queue is no longer full.

24 Claims, 7 Drawing Sheets

(56) References Cited

OTHER PUBLICATIONS

Panigrahy, "Efficient Hashing with Lookups in two Memory Accesses," found at http://arxiv.org/PS_cache/cs/pdf/0407/0407023v1.pdf, Feb. 1, 2008, 12 pp.

Friedgut et al., "Every Monotone Graph Property Has a Sharp Threshold," American Mathematical Society vol. 124, No. 10, Oct. 1996. 10 pp.

Askitis, "Fast Compact Hash Tables for Integer Keys," presented at the 32nd Australasian Computer Science Conference (ACSC 2009), Wellington, New Zealand, Jan. 2009, 10 pp.

Dharmapurikar et al., "Longest Prefix Matching Using Bloom Filters," IEEE/ACM Transactions on Networking, vol. 14, No. 2, Apr. 2006, 13 pp.

Steger et al., "Balanced Allocations: The Heavily Loaded Case," Powerpoint Presentation, Institut fur Informatik Technische Universitat Munchen, Retrieved on Mar. 1, 2011, 14 pp.

U.S. Appl. No. 12/425,517, by Arun Kumar S P et al., filed Apr. 17, 2009.

U.S. Appl. No. 13/194,571, by Scott Mackie, filed Jul. 29, 2011.

U.S. Appl. No. 12/182,619, filed Jul. 30, 2008 entitled Streamlined Packet Forwarding Using Dynamic Filters for Routing and Security in a Shared Forwarding Plane.

Srinivasan et al, "Fast Address Lookups Using Controlled Prefix Expansion," ACM Transactions on Computer Systems, vol. 17 No. 1, Feb. 1999, 40 pp.

\* cited by examiner

DYNAMIC BYPASS MECHANISM TO ALLEVIATE BLOOM FILTER BANK CONTENTION

This application claims the benefit of U.S. Provisional Application No. 61/485,079, and U.S. Provisional Application No. 61/485,074, both filed May 11, 2011, the entire contents of which are incorporated by reference herein.

TECHNICAL FIELD

This disclosure relates to computer networks and, more particularly, to forwarding traffic within computer networks.

BACKGROUND

A computer network is a collection of interconnected computing devices that can exchange data and share resources. In a packet-based network, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

The packets are transmitted between the source device and destination device using intermediate network devices, such as gateways, firewalls, switches and routers. When a network receives an incoming packet or sends an outgoing packet, the network device may apply one or more filters to the packet to perform a defined action on the packet under certain conditions. In order to identify the terms of the filters to apply to a given packet, the network device may extract information from the packet, such as a source or destination Internet Protocol (IP) address, a source or destination port, and protocol. The network device then performs a search of the filter terms installed within the network device to determine whether the extracted information satisfies criteria specified by any of the filter terms.

One conventional approach to identifying matching filter terms to apply to packets includes applying a hash function to at least a portion of the extracted information (i.e., a key) to determine possible locations in a hash table for the extracted information. A key corresponds to a portion of the extracted information having a predefined length (e.g., a prefix of a source or destination IP address). That is, one or more keys are inputted into a hash function to generate one or more possible locations in a hash table. The network device then looks up each possible location in the hash table to determine if the key is found in any of the possible locations. A key is found in the hash table when one or more filter terms are defined for the possible location. According to a longest prefix match algorithm, the router applies the filter terms associated with the longest prefix for which a match is found for the corresponding key in the hash table. Performing the lookup for each key in the hash table is done serially, such that each possible location for the extracted information is looked up in the hash table one location at a time.

In order to improve the speed at which the network device identifies filter terms to apply to the packets, the network device may be configured to minimize the number of lookups in the hash table. In some cases, the network device may utilize a Bloom filter as an initial assessment of whether the key is affirmatively not present within the hash table or, alternatively, whether the key may possibly be stored in the hash table. In this way, the Bloom filter may provide an efficient mechanism for avoiding computationally expensive searches of a hash table when the key is affirmatively not present within the hash table. Conventionally, the Bloom filter is implemented as a bit array that stores one 1-bit value at each entry of the array, where each 1-bit entry may correspond to a different "bucket" of a corresponding hash table and indicate that at least one entry in the hash table exists for that particular "bucket." When the Bloom filter is implemented in hardware (e.g., when the bit array is stored in multiple memory banks), the network device may perform a look up for multiple keys in the Bloom filter in parallel, reducing the total number of clock cycles required to look up all of the keys generated for the extracted information. However, when a large number of search keys all require reads from the same memory bank, the queue for the memory bank may become full and force the scheduling component of the router to stall, so that the scheduler cannot issue lookup requests to any of the memory banks of the Bloom filter until the queue is no longer full. Thus, the memory bank having the full queue may be a bottleneck that limits the overall throughput of the Bloom filter lookups and operation of the network device.

SUMMARY

In general, techniques are described for selectively bypassing a lookup in a Bloom filter when a queue of the Bloom filter is unable to store additional lookup requests. A network device is described in which a scheduler may be programmatically configured to dynamically bypass the Bloom filter in accordance with selectable policies that provide numerous options. For example, in accordance with techniques of this disclosure, the scheduler may be programmatically configured to stall whenever any queue of a Bloom filter becomes full, i.e., never bypass the Bloom filter and always perform the Bloom filter lookup. Alternatively, the scheduler may be configured to dynamically bypass the Bloom filter when any queue or a defined number of queues of a Bloom filter becomes full (i.e., never stall). When two or more Bloom filters are utilized, the scheduler may be programmatically configured to stall only when at least one queue of each Bloom filter is full, stall when any of the Bloom filters has a full queue, or bypass any Bloom filter that has a full queue. When a Bloom filter is bypassed and no lookup is performed in the particular Bloom filter, the search key may be marked as if it was found in the bypassed Bloom filter, thus triggering a complete lookup in the hash table. That is, the key is looked up in the hash table as if the key were found in the Bloom filter even though the Bloom filter may have been dynamically bypassed. As another example, when two or more Bloom filters are used for a hash table, the key may be looked up in the hash table only if the key was found in each of the other Bloom filters or the filter(s) were bypassed. By bypassing the Bloom filter lookup when a queue of the Bloom filter is full, the overall throughput of a router implementing these techniques may be improved.

In one example, a method includes receiving, with a computing device, policy configuration information, and examining a state of a first queue of a first Bloom filter of the computing device. The method also includes determining whether to bypass the first Bloom filter based on the policy configuration information and the state of the first queue.

In another example, a computing device includes a first Bloom filter implemented in hardware comprising a first set of queues and a prefix look up table. The prefix lookup module is configured to receive policy configuration information, examine a state of a first queue of the first set of queues, and determine whether to bypass the first Bloom filter based on the policy configuration information and the state of the first queue.

In another example, a computer-readable storage medium is encoded with instructions for causing one or more programmable processors of a computing device to receive policy configuration information, and examine a state of a queue of a Bloom filter of the computing device. The instructions further cause the one or more programmable processors to determine whether to bypass the first Bloom filter based on the policy configuration information and the state of the first queue.

The techniques of this disclosure may provide several advantages. For example, the techniques provide programmatic control over a Bloom filter in a way that allows software to configure the manner in which a dynamic bypass mechanism is implemented on a particular device. This may allow the dynamic bypass mechanism to be tailored to the particular environment in which the network device is deployed. Bypassing a Bloom filter having a full queue may increase the throughput and performance of a network device as compared to the conventional method of stalling the scheduler whenever any queue becomes full. The increase in throughput that may result from implementing the techniques of this disclosure may be the greatest when there is less variation between search keys. For example, when implementing the longest prefix match algorithm, the shorter prefixes are more likely to require a read from the same memory bank, thus making it more likely that a queue in a Bloom filter will become full. Furthermore, because these techniques result in the key being looked up in a hash table only when a match is not found in the Bloom filter for a longer prefix, the keys for shorter prefixes that bypassed the Bloom filter lookup may not often be looked up in the hash table, reducing any potential decrease in performance caused by additional hash table lookups.

The details of one or more examples are set forth in the accompanying drawings and the description below. Other features, objects, and advantages will be apparent from the description and drawings, and from the claims.

DETAILED DESCRIPTION

Figure 1:
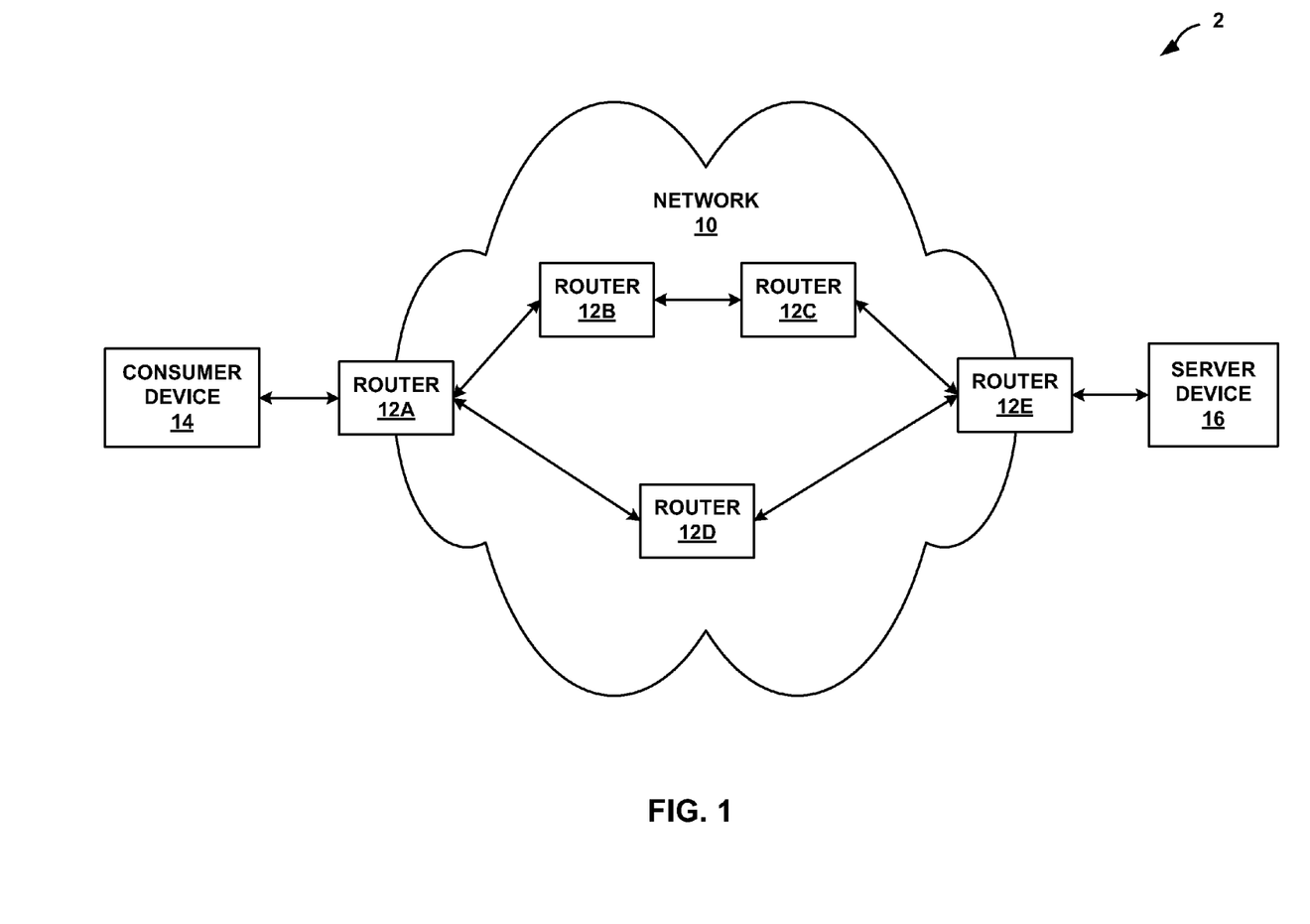
FIG. 1 is a block diagram illustrating an example system including a variety of network devices, any of which may implement the techniques of this disclosure.

FIG. 1 is a block diagram illustrating an example system 2 that includes a variety of network devices, any of which may implement the techniques of this disclosure. As illustrated in FIG. 1, system 2 includes network 10, consumer device 14, and server device 16. Network 10 includes routers 12A-12E (collectively, "routers 12") that facilitate the access of content between various network devices connected to network 10, including consumer device 14 and server device 16. While illustrated as including routers 12, in other examples, system 2 may include additional or alternative network devices, such as gateways, switches, hubs, firewall, instruction detected/prevention (IDP) devices, and/or any other type of networking equipment or device that facilitates the transfer of data between the various network devices. Although described with respect to a router or other network device, any device that includes a hash table and one or more Bloom filters may implement the techniques described herein and the techniques should not be limited to routers or other network devices.

Network 10 enables transmission of content between network devices using one or more packet-based protocols, such as a Transmission Control Protocol/Internet Protocol (TCP/IP). In this respect network 10 may support the transmission of data via discrete data units, often referred to as "packets." As a result, network 10 may be referred to as a "packet-based" or "packet switched" network. While described in this disclosure as transmitting, conveying, or otherwise supporting packets, network 10 may transmit data according to any other discrete data unit defined by any other protocol, such as a cell defined by the Asynchronous Transfer Mode (ATM) protocol, or a datagram defined by the User Datagram Protocol (UDP).

Client device 14, in this example, represents a device that submits requests for services to server device 16. Server device 16, likewise, represents an example of a device that provides services to client device 14 in response to requests. Client device 14 and server device 16 may also participate in a bidirectional communication session, in which server device 16 requests services from client device 14, and client device 14 provides the requested services to server device 16. In this manner, client device 14 and server device 16 can each act as both a server and a client. Client device 14 may represent an endpoint device, such as a mobile device (e.g., a laptop computer, tablet computer, or cellular phone), a personal computer, a computing terminal, an Internet-capable television or device for providing Internet-based television services, or other such devices. Server device 16 may represent a web server, a file server, a peer device (e.g., another user's computing device), a database server, a print server, or other device from which a client device requests services.

Client device 14 submits requests to server device 16 via network 10. In the example illustrated in FIG. 1, client device 14 is communicatively coupled to router 12A. In other examples, client device 14 may be communicatively coupled to router 12A via additional network devices, such as access lines, wireless infrastructure and backhaul networks, and the like. Routers 12 of network 10 are configured to determine routes through network 10 to reach various destinations, such as server device 16. Routers 12 implement routing protocols to determine routes through network 10, as well as to share determined routes with other routers 12. In the example of FIG. 1, router 12A determines that two routes exist to reach server device 16. A first route beginning at router 12A to reach server device 16 includes router 12D, router 12E, and server device 16. A second route beginning at router 12A to reach server device 16 includes router 12B, router 12C, router 12E, and server device 16. In general, router 12A includes a control plane that executes routing protocols to learn the topology of network 10 and to select one of these routes over the other. Upon receiving data from client device 14 destined for server device 16, a data plane of router 12A performs a lookup function on keying information within the packet and forwards the data along the selected route.

Prior to forwarding a packet, routers 12 may apply one or more filters to the packet. In some examples, filters specify one or more conditions and a set of actions to be performed on packets that match the conditions. In various examples, the conditions specify one or more of a source Internet protocol (IP) address, a destination IP address, a source port, a destination port, a protocol, and/or other fields of a packet. The actions to perform may include one or more of appending a label to the packet (for multiprotocol label switching (MPLS) to tunnel the packet), removing or swapping a label on the packet, inspecting the packet for viruses, performing deep packet inspection on the packet, performing quality of service processing on the packet (e.g., prioritizing the packet over other packets), blocking or dropping the packet (e.g., when the source or destination associated with the packet have been determined to be malicious) or other services.

In some examples, the data plane implements a longest prefix match algorithm when forwarding an individual packet to identify one or more filters to apply to the packet. For example, the filters may be stored in a filter table and specify criteria to be matched against the packet, such as network prefix. Collectively, the criteria specified by the filters control which of the filters are to be applied to the packet by the data plane. As one example, router 12A may not necessarily be configured with a specific source or destination network address of an individual server device 16 (e.g., 10.1.1.8), but instead may be configured such that packets having a source or destination address matching a certain prefix (e.g., a range of addresses corresponding to the network prefix 10.1/16) are to have a certain filter applied to the packets by router 12A. In general, the data plane of router 12A uses the longest prefix match algorithm to identify the entry in the filter table that corresponds to the longest prefix that matches the key information of a received packet. Router 12A applies the set of filters specified in the entry of the filter table identified as storing the longest matching prefix that is satisfied by the key information of the received packet.

Routers 12, in some examples, use hashing units to identify filters that match a particular packet. In one example, the hashing unit supports prefix lengths (which act as key values in the hashing unit) from /0 to /128. Prefixes with lengths from /0 to /64, in some examples, consume a single cell of a bucket of the hashing unit, while prefixes with prefix lengths from /65 to /128 consume two consecutive cells, referred to as a double cell, in the hashing unit. Hash tables of the hashing unit, in some examples, physically support 64K single cells, with two cells per bucket. In some examples, if all prefixes are of single cells, each hash table can support loads of approximately 80% to 90% (e.g., 51,000 to 57,600 entries). In some examples, if all prefixes are of double cells, each hash table of the hashing unit can support loads of approximately 40% to 45% (e.g., 28,800 entries). The physical hash tables of a hashing unit may be referred to as key hash tables. In some examples, each key hash table has a capacity of approximately 16K cells and associated results. One example implementation of a hashing unit and corresponding hash tables is described by U.S. patent application Ser. No. 13/239,774, entitled "DYNAMICALLY ADJUSTING HASH TABLE CAPACITY," by Keen et al., filed Sep. 22, 2011, which is hereby incorporated by reference in its entirety.

When adding a value to the key hash table, the hashing unit stores the key value and an associated value in one of the cells of the bucket to which the key value maps. For example, with respect to the filters of router 12A, different length prefixes of source or destination network addresses act as key values, while associated values each represent the particular terms of the filter which match a particular key value. Accordingly, router 12A stores a destination address and an associated value in a cell of a bucket to which a hash function maps the destination address. The associated value may specify a network interface or particular terms of a filter that matches the destination address. By storing the prefixes in the cell, if two or more prefixes are mapped to the same bucket, router 12A can determine which of the cells stores the value associated with a particular length prefix.

In some examples, router 12A includes multiple hashing units to implement a Bloom filter. A Bloom filter is generally a data structure for storing an indication of whether a particular value has been stored (or been previously processed). In one example, a Bloom filter is a bit array that stores one 1-bit value at each entry of the array. The Bloom filter data structure is generally designed such that false negatives are avoided, while leaving open the (albeit small) possibility of false positives. That is, a well-designed Bloom filter can provide an indication of whether a particular value has not been stored, but in some cases may provide an incorrect indication that the value has been stored (when in fact, the value has not been stored).

When router 12A stores a key value in, e.g., the key hash table, router 12A adds the key value to the Bloom filter. In general, when a Bloom filter is queried with a particular value, the Bloom filter provides an indication of whether the value is stored in the Bloom filter. In one example, the lookup returns the value one if the particular value is stored in the Bloom filter and returns the value zero if the particular value is not stored in the Bloom filter. While false positives are possible when using a Bloom filter, false negatives are typically not possible, due to the design of the Bloom filter. Therefore, upon receiving a key value comprising a prefix of a source or destination address for a packet, router 12A first determines whether the key value is stored in the Bloom filter, and if so, determines whether the key value is actually stored in the key hash table.

In some examples, the Bloom filter may be implemented in hardware (e.g., when the bit array is stored in multiple memory banks) or in software. When implemented in hardware, router 12A may perform a look up for multiple keys in parallel, which may reduce the total number of clock cycles required to look up the keys. However, when a large number of search keys all require reads from the same memory bank, a queue for the memory bank may become full, preventing additional lookup requests from being issued to any of the memory banks of the Bloom filter until the queue is no longer full. Thus, the memory bank having the full queue may be a bottleneck that limits the overall throughput of the Bloom filter lookups and the router. The memory bank having the full queue may be referred to as a "hot bank" in this disclosure.

In accordance with the techniques of this disclosure, router 12A may selectively bypass a full queue of the Bloom filter and not perform a lookup in the Bloom filter for the key value. Router 12A is configured with a scheduling element that manages the lookup requests for the Bloom filter. Whenever the scheduling element is unable to assign a request to a queue because the queue is full, the scheduling element may stall to delay assigning any additional lookup requests for the Bloom filter or may bypass a full queue of the Bloom filter. In some examples, router 12A may be configured with two or more Bloom filters. In these examples, the scheduling element may stall when any queue is full, stall when a queue in each of the Bloom filters is full, or bypass any of the Bloom filters having a full queue.

If a lookup is not performed in a Bloom filter for a key value (e.g., when the scheduler bypasses the Bloom filter), according to techniques of this disclosure, router 12A processes the key value as if the key value were found in the Bloom filter. That is, router 12A may search for a key value in the key hash table even though the scheduler bypassed performing a lookup in the Bloom filter. Bypassing the Bloom filter may enable the scheduler to continue processing packets, which may improve the throughput of router 12A compared to stalling the scheduler until the queue of the Bloom filter is no longer full.

When two or more Bloom filters are utilized, router 12A compares the return values for each lookup of the key value. If any return value is zero (e.g., the key value was not in the Bloom filter), router 12A is configured not to perform a further search for the key value in the key hash table. Therefore, when the scheduler bypasses one or more Bloom filters, so long as a search is performed for the key value in at least one Bloom filter and the key value is not found in the Bloom filter, router 12A does not perform a further search in the key hash table. In this manner, implementing two or more Bloom filter tables may reduce the number of searches performed in the key hash table resulting from the scheduler bypassing a Bloom filter search, which may further improve the throughput of router 12A.

In examples where router 12A implements the longest prefix match algorithm to identify the entry in the Bloom filter, the shorter prefixes are more likely to require a read from the same memory bank, thus making it more likely that a queue in a Bloom filter will become full. When the scheduler is configured to bypass a Bloom filter having a full queue, it is more likely that a Bloom filter will be bypassed and router 12A will process the shorter prefixes as if the shorter prefixes were found in the Bloom filter. According to the longest prefix match algorithm, router 12A performs a search in the key hash table for the longest prefix found in the Bloom filter. That is, prefixes found in the Bloom filter that are shorter than the longest prefix may be discarded and router 12A may not perform a search for the shorter prefixes in the key hash table. Thus, because these techniques only result in the key being searched in the key hash table when a match is not found in the Bloom filter or the key hash table for a longer prefix, the keys for shorter prefixes that bypassed the Bloom filter lookup may not often be searched up in the hash table, reducing any potential decrease in performance caused by additional key hash table searches.

Though described primarily with respect to router 12A, it should be understood that the techniques of this disclosure may be implemented by any of routers 12, client device 14, service device 16, or any other computing device that would implement hashing functionality. Moreover, the techniques of this disclosure may be applied to other contexts and for other uses. For example, the techniques of this disclosure may also be applied by router 12A when performing packet lookup and forwarding. The data plane of router 12A may implement the longest prefix match algorithm when forwarding an individual packet to identify an entry of a forwarding information base (FIB) of the data plane that best matches the destination address of the packet. Router 12A, in various instances, stores the FIB in a hashing unit having a plurality of hash tables and implements one or more Bloom filters in conjunction with the hashing tables. Router 12A may then apply techniques of this disclosure to programmatically configure the hashing unit of the FIB to dynamically bypass one or more of the Bloom filters.

Figure 2:
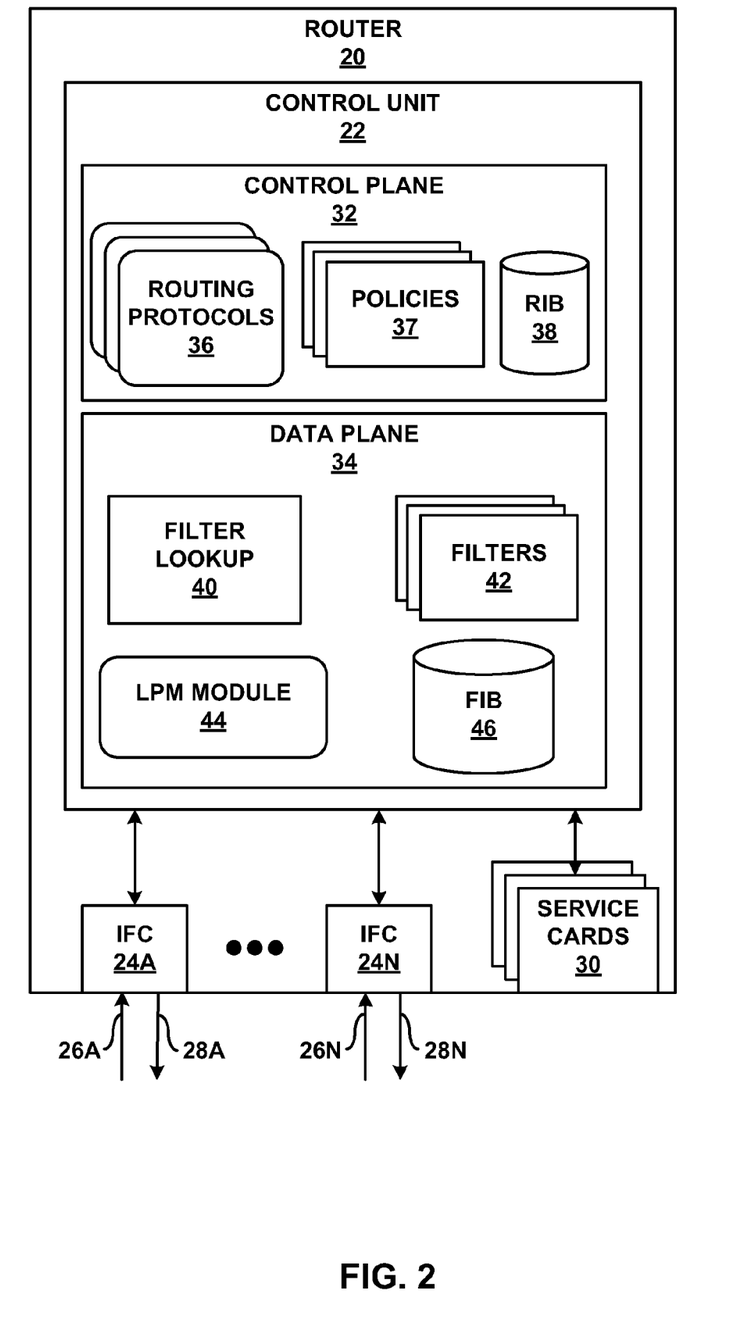
FIG. 2 is a block diagram illustrating an example router including a filter lookup block that is configured in accordance with one or more techniques of this disclosure.

FIG. 2 is a block diagram illustrating an example router 20 including a filter lookup block 40 that is configured in accordance with one or more techniques of this disclosure. For purposes of illustration, router 20 may be described below within the context of system 2 shown in the example of FIG. 1 and may represent any one of routers 12. In this example embodiment, router 20 includes control unit 22, interface cards (IFCs) 24A-24N (collectively, "IFCs 24"), and service cards 30.

Router 20 typically include a chassis (not shown in the example of FIG. 2 for ease of illustration purposes) having a number of slots for receiving a set of cards, including IFCs 24 and service cards 30. Each card may be inserted into a corresponding slot of a chassis for communicably coupling the card to a control unit 22 via a bus, backplane, or other electrical communication mechanism. IFCs 24 send and receive packet flows or network traffic via inbound network links 26A-26N (collectively, "inbound links 26") and outbound network links 28A-28N (collectively, "outbound links 28"). Inbound links 26 and outbound links 28 in some examples for common IFCs form common, physical communication media for the IFCs, which operate in full duplex mode. That is, in some examples, each of IFCs 24 is coupled to respective communication media that can send and receive data substantially simultaneously. In other examples, inbound links 26 and outbound links 28 form separate physical media for respective IFCs 24.

Control unit 22 may include one or more processors (not shown in FIG. 2) that execute software instructions, such as those used to define a software or computer program, stored on a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 22 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 22 may also be divided into logical or physical "planes" to include a first control or routing plane 32, and a second data or forwarding plane 34. In some examples, control unit 22 may be further divided into a third logical or physical "plane," a service plane. That is, control unit 32 may implement three separate functionalities, e.g., the routing, forwarding and service functionalities, either logically, e.g., as separate software instances executing on the same set of hardware components, physically, e.g., as separate physical dedicated hardware components that either statically implement the functionality in hardware or dynamically execute software or a computer program to implement the functionality, or some combination of logical and physical implementations.

Control plane 32 of control unit 22 may provide the routing functionality of router 20. In this respect, control plane 32 may represent hardware or a combination of hardware and software of control unit 22 that implements routing protocols 36. Routing protocols 36 may include, for example, intermediate system to intermediate system (IS-IS), open shortest path first (OSPF), routing information protocol (RIP), border gateway protocol (BGP), or other routing protocols. By executing routing protocols 36, control plane 32 identifies existing routes through the network and determines new routes through the network. Control plane 32 stores routing information within routing information base (RIB) 38. The routing information may include information defining a topology of a network, such as network 10 of FIG. 1. Control plane 32 may resolve the topology defined by the routing information to select or determine one or more routes through network 10.

Control plane 32 may then update data plane 34 in accordance with these routes to program data plane 34 with forwarding information stored within forwarding information base (FIB) 46. The forwarding information associates keying information (e.g., IP addresses or IP prefixes or labels) with next hops (e.g., neighboring routers) and ultimately with output interfaces of router 20 coupled to outbound links 28. When forwarding a packet, data plane 34 processes a key extracted from the packet's header to traverse the forwarding information stored in FIB 46 and selects a next hop to which to forward the packet. Based on the selected next hop, data plane 34 identifies the set of one or more outbound links 28 that are coupled to the next hop.

Prior to forwarding a packet via one or more outbound links 28, data plane 34 may apply one or more filters to the packet. As illustrated in FIG. 2, data plane 34 includes a filter lookup block 40, filters 42, and a longest prefix match algorithm module (LPM MODULE) 44. Filters 42 include one or more filters defined for one or more different network address prefixes. In some examples, filters specify one or more conditions and a set of actions to be performed on packets that match the network address prefixes. The actions may include one or more of appending a label to the packet, removing or swapping a label on the packet, inspecting the packet for viruses, performing deep packet inspection on the packet, performing quality of service processing on the packet, blocking or dropping the packet or other services.

In general, longest prefix match algorithm module 44 implements the longest prefix match algorithm and is used by filter lookup block 40 to identify the terms of a filter 42 that match the network address for the longest defined prefix of the network address. According to the longest prefix match algorithm, a certain number of prefixes are generated from a network address. The number of prefixes generated from a network address may be configured by an administrator or may vary based on the type of network address used for the algorithm, as examples. In one example, sixteen or fewer prefixes, each having a different length, are generated based on the network address. One goal of the longest prefix match algorithm is to find the longest prefix having a match. In accordance with this goal, the hardware or software implementing the longest prefix match algorithm first performs a search for the longest prefix (i.e., the most specific prefix). If no match is found, a search is performed for the next longest prefix. This continues until a match is found or until a search has been performed for all possible prefixes.

Filter lookup block 40 stores the prefixes for which at least one filter is defined. In some examples, the prefix stored in filter lookup block 40 may be concatenated with the prefix length (e.g., the prefix 10.1 may be concatenated with the prefix length /16 for the entry "10.1/16" in filter lookup block 40). Filter lookup block 40 also generates a set of prefixes for each packet received by router 20 and searches for an associated value for each packet using the longest prefix match algorithm. That is, filter lookup block 40 performs searches on each of the generated prefixes, starting with the longest prefix and moving to the shortest prefix, in order, until a match is found. In one example, the longest prefix match may be performed by filter lookup block 40 on a source address (e.g., a source media access control address, a source IP address, or a source identifier) or a destination address (e.g., a destination media access control address, a destination IP address, or a destination identifier).

An administrator of router 20 may configure policies 37 that may be used by control plane 32 to programmatically configure the manner in which filter lookup block 40 performs the filter lookups. For example, control plane 32 may receive system performance information from data plane 34 that is reflective of the performance of filter lookup block 40. Based on policies 37 and the system performance information, control plane 32 configures filter lookup block 40 in a manner that, in various instances, may increase the performance of filter lookup block 40. That is, control plane may select one of policies 37 to configure filter lookup block 40. One aspect of filter lookup block 40 configurable by control plane 32 includes the manner in which filter lookup block 40 manages the processing of packets when one or more queues of filter lookup block 40 become full. Further details of filter lookup block 40 are described with respect to FIGS. 3-5.

Figure 3:
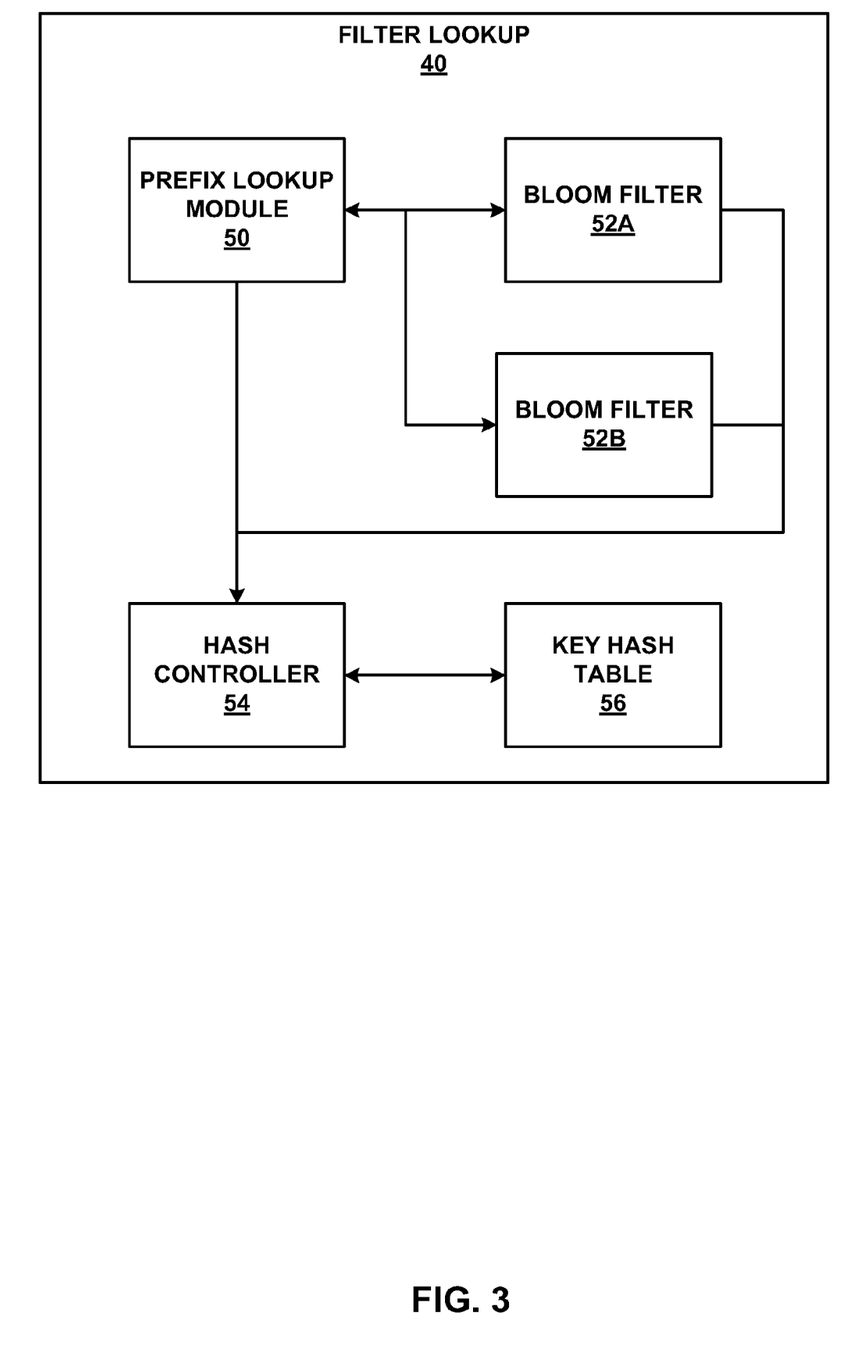
FIG. 3 is a block diagram illustrating an example filter lookup block of the router in greater detail.

FIG. 3 is a block diagram illustrating an example filter lookup block 40 of router 20 in greater detail. For purposes of illustration, filter lookup block 40 may be described below within the context of router 20 shown in the example of FIG. 2. In this example embodiment, filter lookup block 40 includes prefix lookup module 50, Bloom filters 52A and 52B (collectively, "Bloom filters 52"), hash controller 54 and key hash table 56. The entries of prefix lookup module 50, Bloom filters 52, and key hash table 56 may be configured based on input received from an administrator interacting with router 20. For example, if the administrator configures a new filter on router 20, filter lookup block 40 stores one or more prefixes associated with the filter within key hash table 56 and adds entries in each of Bloom filters 52 to indicate that there are corresponding matching entries in key hash table 56 for the prefixes.

In general, when router 20 receives a packet, at least a portion of the information included in the packet is sent to filter lookup block 40. In one example, the source or destination network address included in the packet is sent to filter lookup block 40. Filter lookup block 40 generates a set of prefixes using the network address. The number and the lengths of the prefixes generated from the network address are specified in prefix lookup module 50. Further details of prefix lookup module 50 are described with respect to FIG. 4.

After generating the set of prefixes specified in prefix lookup module 50, filter block 40 performs a lookup for the one or more of the generated prefixes in each of Bloom filters 52. That is, the full set of generated prefixes is looked up in Bloom filter 52A and in Bloom filter 52B. For each prefix looked up in each Bloom filter 52, a value is returned indicating whether the prefix was found in the respective Bloom filter 52. In one example, the value one indicates that the prefix was found and the value zero indicates that the prefix was not found. In accordance with techniques of this disclosure, either or both of Bloom filters 52 may be bypassed if a queue of the Bloom filter is full. Bypassing a Bloom filter means that a lookup is not performed in the bypassed Bloom filter for one or more of the generated prefixes. For each of Bloom filters 52 that is bypassed, a value indicating that the prefixes were found in the bypassed Bloom filter (e.g., the value one) is passed to hash controller 54. That is, hash controller 54 process the prefixes not looked up in one or both of Bloom filters 52 as if the prefixes were found in the bypassed Bloom filter. While shown in FIG. 3 as including two Bloom filters 52A and 52B, other examples of filter lookup block 40 may include one Bloom filter or more than two Bloom filters.

Hash controller 54 determines whether to perform a lookup in key hash table 56 for each prefix. Hash controller 54 examines the value returned from the Bloom filter lookup for each of the prefixes and identifies the longest prefix that may be included in key hash table 56. If both values returned from the lookups performed in Bloom filters 52A and 52B indicate that the prefix may be included in key hash table 56, hash controller 54 determines that the prefix may be included in key hash table 56. If either value returned from the lookups performed in Bloom filter tables 52A and 52B indicates that the prefix is not included in key hash table 56, hash controller determines that the prefix is not included in key hash table 56. The likelihood of getting a false positive result for a single prefix from both Bloom filters is lower than if only one Bloom filter is used. Because hash controller 54 considers performing a lookup for a prefix in key hash table 56 only when the return values from both of Bloom filters 52 indicate that the prefix may be in the set, the number of unneeded or unsuccessful lookups performed on key hash table 56 may be reduced when two Bloom filters are used as compared to when one Bloom filter is used.

Hash controller 54 identifies the longest prefix that may be in key hash table 56 and performs a lookup in key hash table 56 using the identified prefix. When hash controller 54 performs the lookup, hash controller 54 applies a hash function to the prefix in order to identify the location in key hash table 56 at which the prefix should be located if the prefix is stored in key hash table 56. If the prefix is not found in key hash table 56, hash controller 54 then identifies the next longest prefix that may be in key hash table 56 and performs a lookup in key hash table 56 using the next longest prefix. This process continues until a prefix is found in key hash table 56 or there are no more prefixes to lookup in key hash table 56. If a match is found, filter lookup block 40 returns information that identifies the key and associated value. If a match is not found, filter lookup block 40 returns an indication that no match was found for the packet.

Figure 4:
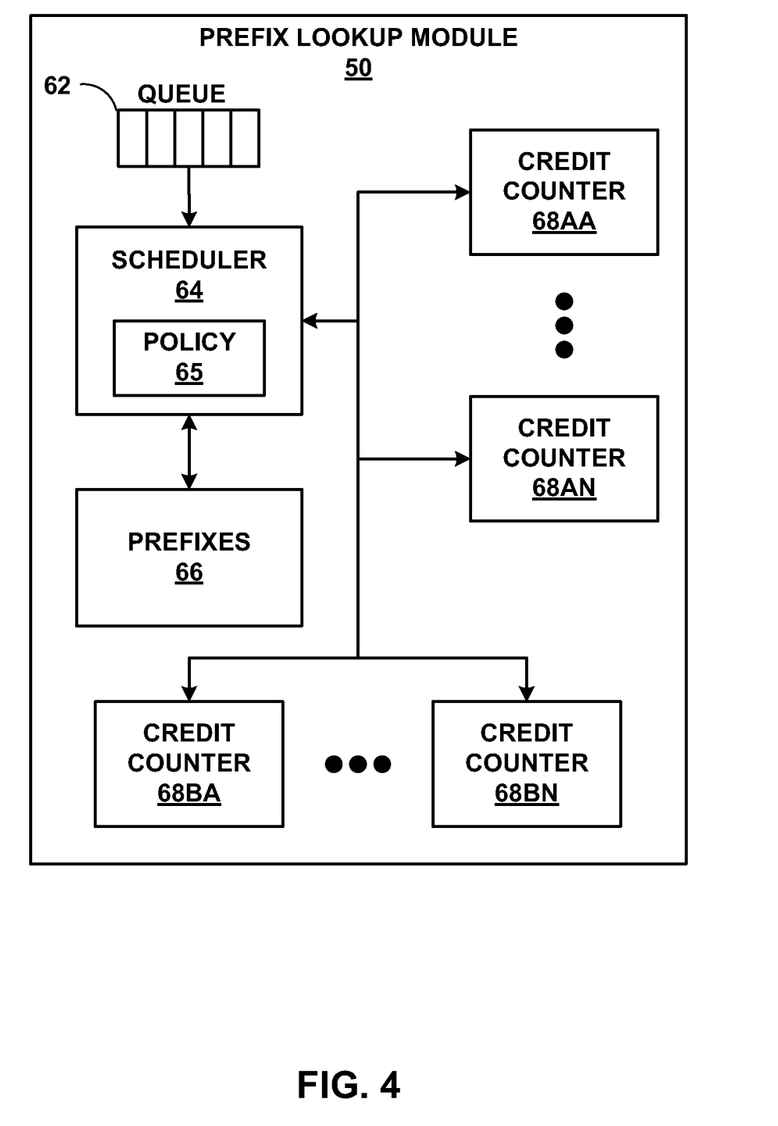
FIG. 4 is a block diagram illustrating an example prefix lookup module of the router in greater detail.

FIG. 4 is a block diagram illustrating an example prefix lookup module 50 of router 20 in greater detail. For purposes of illustration, prefix lookup module 50 may be described below within the context of filter lookup block 40 shown in the example of FIG. 3 and router 20 shown in the example of FIG. 2. Prefix lookup module 50 is one example of a prefix lookup module of router 20. In other examples, router 20 may include a prefix lookup module having a different configuration. Prefix lookup module 50 includes queue 62, scheduler 64, prefixes 66, credit counters 68AA-68AN (collectively, "credit counters 68A") and credit counters 68BA-68BN (collectively, "credit counters 68B").

In general, prefix lookup module 50 stores a set of prefix lengths in prefixes 66 for the longest prefix match key. The prefix lengths stored in prefixes 66 are determined at least in part by a software process executing within control plane 32. The prefix length indicates the number of upper bits of a mask-able key that should be used in comparison with the key hash table prefix. For example, a prefix length of /128 indicates that all 128 bits of a mask-able key should be used in comparison with the key hash table prefix. As another example, a prefix length of /64 indicates that the upper 64 bits of a mask-able key should be used in comparison with the key hash table prefix. Thus, the longest prefix is the prefix for which the most bits are used when comparing the prefix with the key hash table prefix (i.e., a prefix length of /128 is longer than a prefix length of /64).

When prefix lookup module 50 receives a network address, the network address is placed in queue 62. Queue 62 provides a temporary storage repository for one or more incoming network addresses. If, for example, prefix lookup module 50 stalls such that no lookup requests are sent to Bloom filters 52, queue 62 provides a buffer for the incoming addresses, which may minimize the number of network addresses that may be lost or dropped when prefix lookup module 50 stalls.

Scheduler 64 provides the scheduling functionality of prefix lookup module 50. That is, scheduler 64 manages the generation of the prefixes from the received network addresses as well as the lookup requests for Bloom filters 52. Scheduler 64 retrieves a network address from queue 62 and generates a set of prefixes from the network address based on the prefix length control information specified in prefixes 66. Prefixes 66 stores the number and the length of the prefixes that are to be generated for each network address. In one example, according to the information stored in prefixes 66, scheduler 64 generates sixteen or fewer different prefixes from one network address. The generated prefixes each have a different length, such as /32, /24, /16, or /8, as non-limiting examples. Scheduler 64 generates the prefixes by masking the number of bits from the network address as indicated by the length of the prefix. For example, if the network address is 10.1.1.7 and the prefix length is /16, the generated prefix is 10.1/16, and if the prefix length is /24, the generated prefix is 10.1.1/24.

Once the prefixes are generated, scheduler 64 determines whether to issue lookup requests for the set of generated prefixes. Scheduler 64 retrieves values from credit counters 68A and 68B. Credit counters 68A and 68B keep track of how many prefixes have been sent to each queue of Bloom filters 52. In the examples illustrated in FIGS. 2-5, credit counters 68A correspond to Bloom filter 52A and credit counters 68B correspond to Bloom filter 52B. In particular, each credit of credit counters 68A corresponds to a queue of Bloom filter 52A (i.e., credit counter 68AA corresponds to queue 70A of Bloom filter 52A shown in FIG. 5). In other examples, prefix lookup module 50 may be configured with a single credit counter for each Bloom filter instead of a credit counter for each queue of each Bloom filter. In general, when prefix lookup module 50 sends a prefix to a queue, the corresponding credit counter is decremented. When the lookup in the Bloom filter table is completed, the corresponding credit counter is incremented. The starting value for each credit counter is the size of the corresponding queue in the Bloom filter. The details of Bloom filters 52 are described with respect to FIG. 5.

As one example, credit counter 68AA corresponds to a first queue of Bloom filter 52A having eight slots. The queue of Bloom filter 52A is configured to store lookup requests for particular prefix lengths. In this example, credit counter 68AA is initially set to the value eight, corresponding to the eight slots of the queue. When scheduler 64 issues a lookup request for the prefix length associated with the queue, the value stored in credit counter 68AA is decremented to the value seven. Once Bloom filter 52A performs the lookup, the value stored in credit counter 68AA is incremented to the value eight. If the queue fills up (e.g., eight lookup requests are issued for a prefix length without any being performed), the value stored in credit counter 68AA is zero. When value stored in credit counter 68AA is zero, it indicates that the queue of Bloom filter 52A associated with credit counter 68AA is full.

If scheduler 64 determines that the value of credit counter 68AA is zero, scheduler 64 may be configured to either bypass Bloom filter 52A or stall until the value of credit counter 68AA is greater than zero. When scheduler 64 "bypasses" a Bloom filter, scheduler 64 sends a message to hash controller 54 indicating that the prefix associated with the full queue was found in the Bloom filter having the full queue and does not issue a lookup request to the Bloom filter for the prefix. The message may be referred to as a Bloom filter lookup result. Typically, scheduler 64 bypasses the Bloom filter for just the prefix associated with the full queue. That is, scheduler 64 issues lookup requests for each of the prefixes associated with queues of the Bloom filter that are not full. If a queue of Bloom filter 52A for a prefix is full and the queue of Bloom filter 52B for the prefix is not full, scheduler 64, in some examples, issues a lookup request for the prefix to Bloom filter 52B, but not to Bloom filter 52A.

Scheduler 64 may be dynamically configured by software executing on router 20 (e.g., an operating system executing in control plane 32) or by an administrator. The software or administrator may configure scheduler 64 by, for example, setting a value of a control register corresponding to policy 65. In one example, control plane 32 of router 20 programs the hardware of data plane 34 with a selected one of policies 37 to cause scheduler 64 to be programmatically configured to implement the selected one of policies 37 as policy 65. Policy 65 stores policy configuration information that controls whether scheduler 64 dynamically bypasses one of more of Bloom filters 52. That is, policy 65 is the policy configuration information that corresponds to the manner in which scheduler 64 responds when a queue of a Bloom filter is full. The policy configuration information stored in policy 65 changes when control plane 32 programs the hardware of data plane 34 to implement a different one of policies 37. In examples where there is one Bloom filter, scheduler 64 may be configured to either stall when a queue of the Bloom filter is full (e.g., when the credit counter for a queue is zero) or bypass the Bloom filter. In examples where there are two Bloom filters, scheduler 64 may be configured to stall when any queue of any Bloom filter is full, stall only when at least one queue in each Bloom filter is full, or bypass any Bloom filter having a full queue (i.e., never stall).

In examples where control plane 32 dynamically configures policy 65 of scheduler 64, control plane 32 may monitor system performance and configure policy 65 with policy configuration information based on the system performance of router 20 and policies 37. For example, control plane 32 may receive real-time information on how much activity is being performed by filter lookup block 40, how many false positives are occurring with the current configuration, as well as other system performance measures. False positives occur when hash controller 54 determines that a prefix is the longest prefix having return values from both of Bloom filters 52 indicating that the prefix is stored in key hash table 56, but, when hash controller 54 performs a lookup on the prefix in key hash table 56, the prefix is not found.

In one example, if scheduler 64 is configured to never stall and the software detects a large number of false positives, control plane 32, in various instances, may change the configuration of scheduler 64 by programming the hardware of data plane 34 such that policy 65 causes scheduler 64 to stall only when at least one queue in each Bloom filter is full or to stall whenever any queue of any Bloom filter is full. If scheduler 64 is configured to stall whenever any queue of any Bloom filter is full, but the software determines that the system performance is suboptimal, the software may, in various instances, reconfigure scheduler 64 to never stall or stall only when at least one queue in each Bloom filter is full. In this manner, control plane 32 may programmatically configure how scheduler 64 processes Bloom filter lookups when one or more queues of Bloom filters 52 are full.

Figure 5:
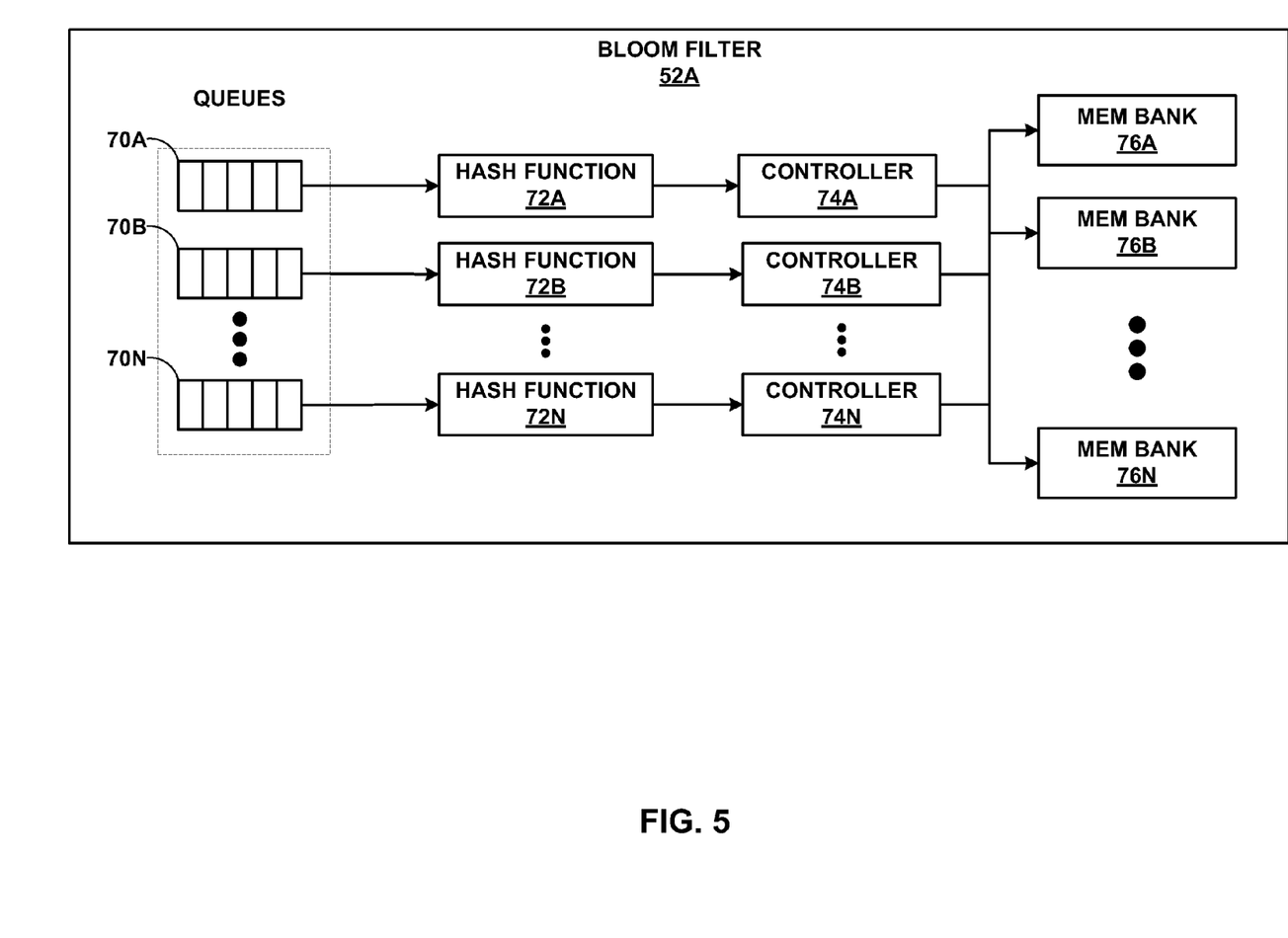
FIG. 5 is a block diagram illustrating an example Bloom filter of the router in greater detail.

FIG. 5 is a block diagram illustrating an example Bloom filter 52A of router 20 in greater detail. For purposes of illustration, Bloom filter 52A may be described below within the context of filter block 40 shown in the example of FIG. 3 and router 20 shown in the example of FIG. 2. Bloom filter 52A is one example of a Bloom filter of router 20. In other examples, router 20 may include Bloom filters having a different configuration. Bloom filter 52A includes queues 70A-70N (collectively, "queues 70"), hash functions 72A-72N (collectively, "hash functions 72"), controllers 74A-74N (collectively, "controllers 74"), and memory banks (MEM BANK) 76A-76N (collectively, "memory banks 76").

Each of memory banks 76 is a separate hardware bank of memory that may each be accessed in parallel with other ones of memory banks 76. The data structure of Bloom filter 52A is stored in memory banks 76 such that the values indicating whether a prefix was likely stored in key hash table 56 or definitely not stored in key hash table 56 are stored across memory banks 76 based on the results of applying a hash function to each prefix associated with a filter. In one example, the number of memory banks 76 is the same as the number of queues 70. In another example, the number of memory banks 76 is greater than the number of queues 70 (e.g., 32 memory banks when there are 16 queues). By having more memory banks 76 than queues 70, the values may be spread across more memory banks, thus reducing the likelihood that two different prefixes will require lookups from the same one of memory banks 76. Reducing the number of prefixes that require lookups from the same one of memory banks 76 may increase the parallelism of the lookup operation and may decrease the buildup of prefixes in one or more of queues 70.

Bloom filter 52A receives a set of prefixes from prefix lookup module 50 and temporarily stores the prefixes in queues 70. Each of queues 70 is configured to store prefixes of a certain length. In one example, queues 70 includes 16 queues where each queue is configured to store one of sixteen different length prefixes included in the set of prefixes received from prefix lookup module 50. For example, queue 70A may be configured to store the longest prefix length from a set of sixteen prefix lengths (e.g., prefixes of length /32), queue 70B may be configured to store the second longest prefix length from the set of sixteen prefix lengths (e.g., prefixes of length /24), and queue 70N may be configured to store the shortest prefix length from the set of sixteen prefix lengths (e.g., prefixes of length /2). While illustrated as each of queues 70 having five "slots" for storing prefixes, queues 70 may be configured with any amount of storage (e.g., any number of bytes) capable of having any number of "slots" for storing prefixes (e.g., four, eight, or twelve slots). The number of slots, in various instances, is equal to the initial value of the corresponding credit counter of prefix lookup module 50. For example, because queue 70A of Bloom filter 52A includes enough room to store five prefixes, the initial value of credit counter 68AA is five.

When Bloom filter 52A performs a lookup, Bloom filter 52A removes a set of prefixes from queues 70. In one example, queues 70 are configured as first-in-first-out queues such that when Bloom filter 52A removes a prefix from one of queues 70, Bloom filter 52A removes the prefix that was first added to the queue (i.e., the prefix that was in the queue for the longest period of time). Upon removing a prefix from each of queues 70, Bloom filter 52A applies a respective one of hash functions 72 to the prefix to generate a location within memory banks 76 (e.g., a memory address) in which to look for the prefix. Hash functions 72 may be implemented in hardware such that hash functions 72 include N different hardware implementations of the same hash function. In some examples, the number of hardware-implemented hash functions equals the number of queues 70.

Each of hash functions 72 may be the same hash function within a single Bloom filter, but may be different between Bloom filters. For example, the hash functions implemented in Bloom filter 52A may be different than the hash functions implemented in Bloom filter in 52B. By implementing different hash functions in different Bloom filters, the likelihood that all of the Bloom filters will return a false positive is reduced as compared to implementing one hash function in multiple Bloom filters. By implementing one hash function 72 in hardware for each of queues 70, hash functions 72 may hash each of the set of prefixes in parallel.

The value generated by hashing the prefix is the index for the Bloom filter. The index is passed to the respective one of controllers 74. The index serves as a memory address. Controllers 74 perform a read from a memory bank 76 based on the index. In one example, controllers 74 examine the first five bits of the index to determine which one of memory banks 76 to use for the lookup. Controllers 74 may also be implemented in hardware and the number of controllers 74 may be the same as the number of queues 70. By implementing controllers 74 in hardware and implementing the same number of controllers 74 as the number of queues 70, controllers 74 may determine the appropriate one of memory banks 76 in which to perform the read from a memory bank 76 for the index value for each of the set of prefixes in parallel.

In some instances, two or more prefixes of a single set of prefixes may require a lookup in the same one of memory banks 76. In these instances, one lookup is typically performed on the one memory bank 76 in one clock cycle and the second lookup on the one memory bank 76 is performed in the next clock cycle. For example, if the first prefix is retrieved from queue 70A and the second prefix is retrieved from queue 70B and both prefixes require a lookup in memory bank 76B. In this example, controller 74A may perform a lookup on the first prefix in memory bank 76B in a first clock cycle and controller 74B may perform a lookup on the second prefix in memory bank 76B in the second clock cycle.

During the second clock cycle, Bloom filter 52A may retrieve another prefix from queue 70A because a lookup was performed on the previously retrieved prefix. In this manner, the lengths of each of queues 70 may be different. During the second clock cycle, prefix lookup module 50 may send an additional set of prefixes to Bloom filter 52A, which are then stored in queues 70. If several prefixes require a lookup from the same one of memory banks 76, one or more of queues 70 may fill up, which may cause one or more of credit counters 68A of prefix lookup module 50 to reach zero, indicating that the corresponding queues are full.

After a lookup is performed by each of controllers 74, controllers 74 sends the result of the lookup to hash controller 54 of filter lookup block 40 and an indication that a lookup is complete to prefix lookup module 50 so that scheduler 64 may increment the respective one of credit counters 68A. For example, when controller 74A completes a lookup for a prefix retrieved from queue 70A, controller 74A sends the result of the lookup to hash controller 54. The result of the lookup indicates whether the prefix is likely stored in key hash table 56 or is definitely not stored in key hash table 56. Controller 74A also sends a message to prefix lookup module 50 that causes the value stored in credit counter 68AA to be incremented, indicating that there is one additional slot available in queue 70A.

Figure 6A:
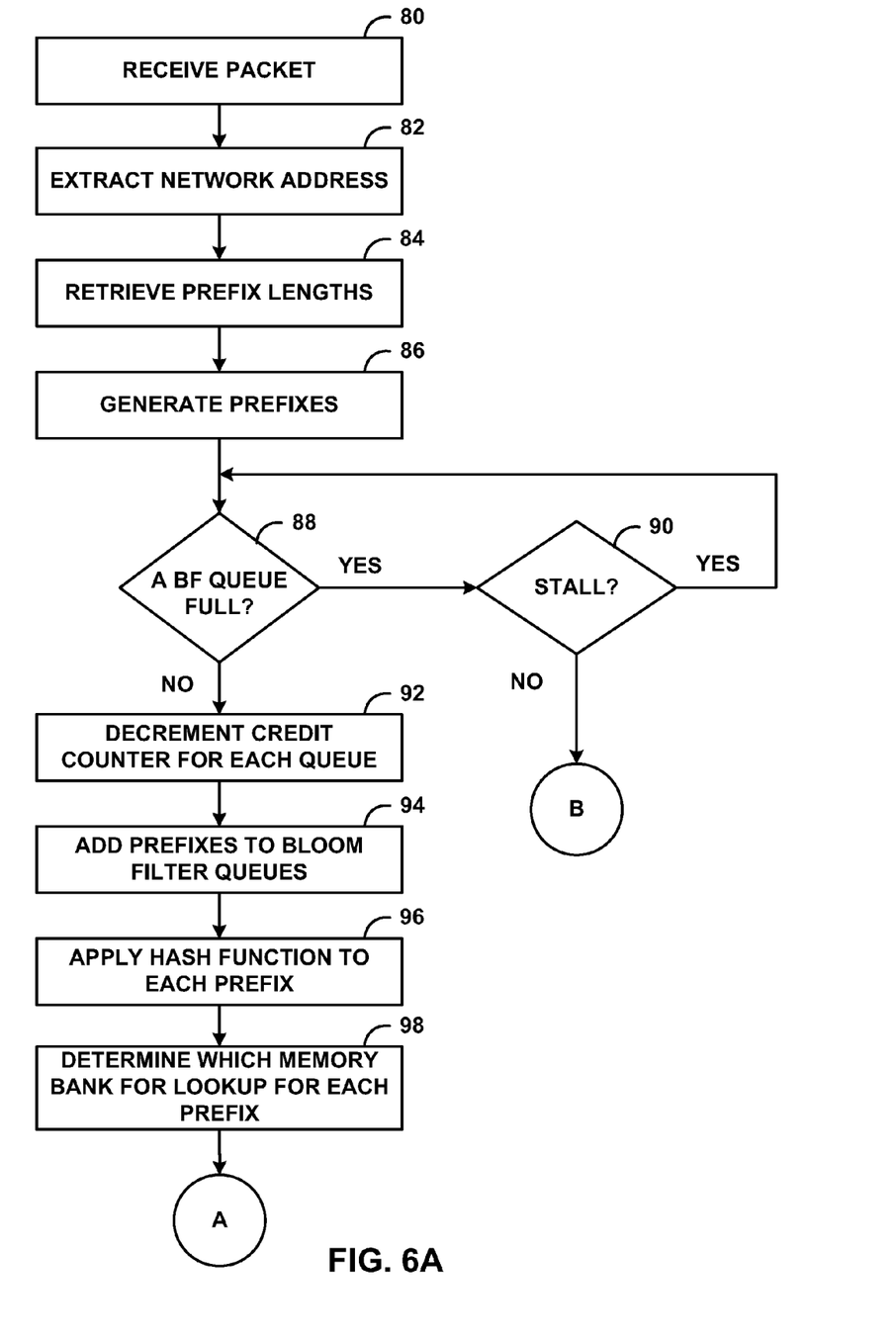
FIGS. 6A and 6B are flowcharts illustrating an example method for performing a lookup in accordance with one or more techniques of this disclosure.
Figure 6B:
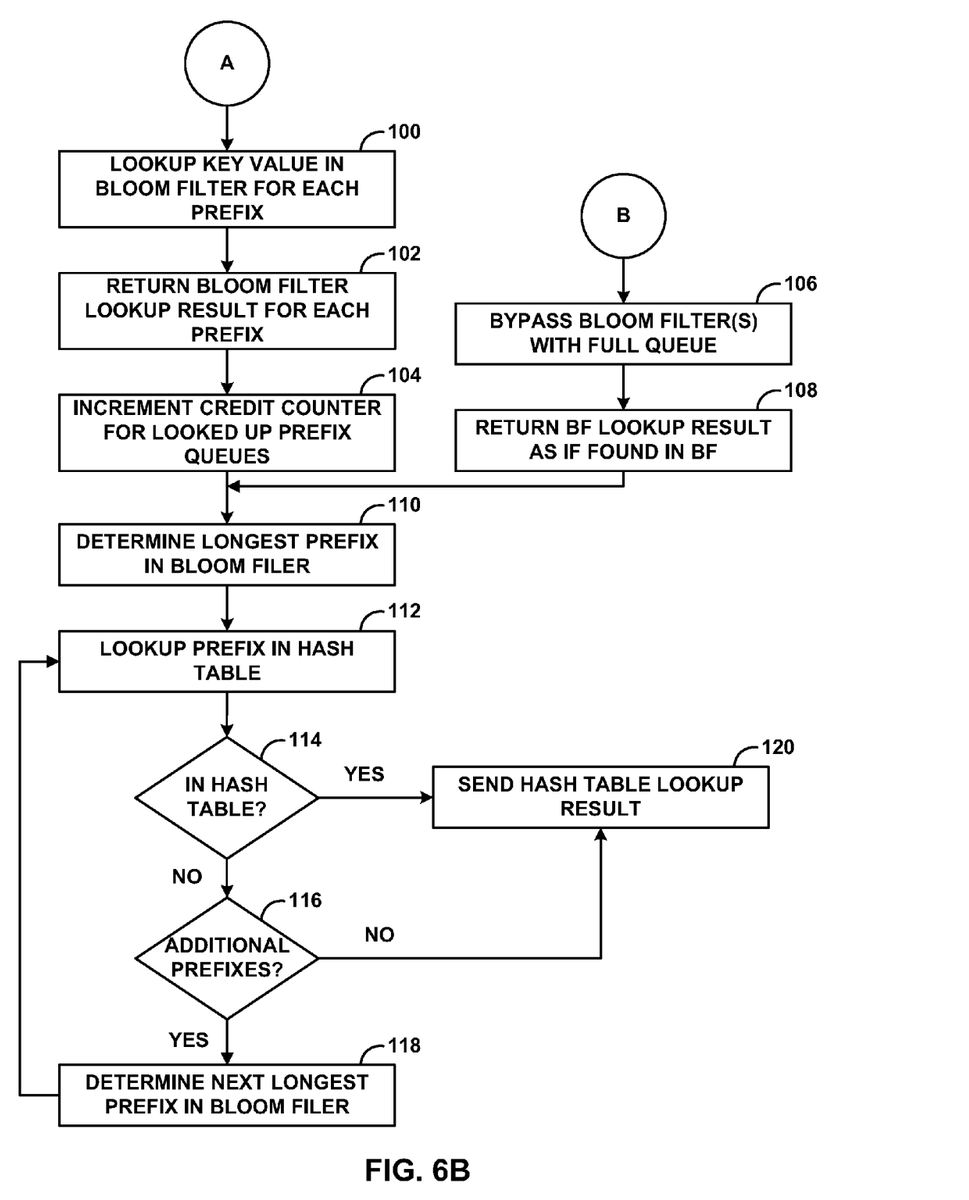

FIGS. 6A and 6B are flowcharts illustrating an example method for performing a lookup in accordance with one or more techniques of this disclosure. For purposes of clarity, the method shown in FIGS. 6A and 6B will be described with respect to system 2 of FIG. 1, router 20 of FIG. 2, filter lookup block 40 of FIG. 3, prefix lookup module 50 of FIG. 4, and Bloom filter 52A of FIG. 5. Router 20 receives a packet via one of IFCs 24 and inbound links 26 from a device (e.g., consumer device 14 of FIG. 1) (80). Data plane 34 extracts information from the packet as key information (82). In some examples, the information is extracted from a header of the packet and may include a source or destination network address, a source or destination port, or a protocol.

Prefix lookup module 50 of filter block 40 of router 20 retrieves a set of prefix lengths and a number of prefixes to generate from prefixes 66 (84). The information stored in prefixes 66 indicates that sixteen prefixes should be generated for a 32-bit IP address and the prefix lengths should be /2, /4, /6, /8, /10, continuing to /32. Prefix lookup module 50 then generates a set of prefixes using the key information and the prefix information retrieved from prefixes 66 (86). When generating the prefixes from the key information, prefix lookup module 50 masks a number of bits of the lower portion of the key information based on the prefix length. For example, if the prefix length is /8 and the key information is the 32-bit IP address 192.168.1.43, the prefix is 192/8 as the lower 24 bits of the IP address are masked with zeros. If the prefix length is /24, the prefix is 192.168.1/24.

Scheduler 64 of prefix lookup module 50 then determines whether a queue of a Bloom filer is full (88). In the example shown in FIG. 3, filter lookup block 40 includes two Bloom filters. Scheduler 64 determines if any queue of the first Bloom filter is full and if any queue of the second Bloom filter is full. Each queue of each Bloom filter has a corresponding credit counter. When scheduler 64 determines if the first Bloom filter (e.g., Bloom filter 52A) has a full queue, scheduler 64 examines the value stored in each of credit counters 68A. Each of credit counters 68A that has a value of zero indicates that the corresponding queue of Bloom filter 52A is full.

If scheduler 64 determines that one of the queues of Bloom filter 52A or 52B is full ("YES" branch of 88), scheduler then determines whether scheduler 64 should stall or bypass the Bloom filter (90). Scheduler 64 may be dynamically configured to stall or bypass one or more Bloom filters based various system performance measurements of router 20, including throughput and the rate of false positives detected by hash controller 54. In examples where router 20 is configured with one Bloom filter table, scheduler 64 may be configured to stall or bypass the Bloom filter if any queue of the Bloom filter is full. In examples where router 20 is configured with two Bloom filter tables (e.g., Bloom filters 52A and 52B), scheduler 64 may be configured to stall when any queue of either Bloom filter is full, stall only when at least one queue in both Bloom filters is full, or never stall (i.e., bypass any Bloom filter having a full queue).

In examples where scheduler 64 is configured not to stall (i.e., to bypass the Bloom filter) ("NO" branch of 90), scheduler 64 bypasses the Bloom filter (106) by not sending a lookup request to the Bloom filter for the prefix and sends a message to hash controller 54 that indicates that the prefix associated with the full queue was in the Bloom filter (108). The hash table receives the lookup result from scheduler 64 and proceeds with determining which prefix to lookup in key hash table 56 as described below starting with element 110. In examples where scheduler 64 is configured to stall ("YES" branch of 90), scheduler 64 waits until the queue of the Bloom filter is no longer full and proceeds with the techniques for issuing a lookup request to the Bloom filter described below starting with element 92.

If scheduler 64 determines that none of the queues of a Bloom filter are full ("NO" branch of 88), scheduler 64 decrements the value stored in each of the credit counters associated with the queues of the Bloom filter (i.e., credit counters 68A that are associated with queues 70 of Bloom filter 52A) (92). Scheduler 64 then sends the prefixes to Bloom filters 52A and 52B and the prefixes are stored in the respective set of queues of the Bloom filters 52 (94). Each Bloom filter 52 removes a prefix from each queue and applies one of hash functions 72 to the prefix to generate an index for the data structure of the Bloom filter 52 (96). The index, in one example, is a memory address of a location in a memory bank of the Bloom filter. Each of Bloom filters 52 implements a different hash function that is independent from the hash function implemented in the other Bloom filter 52. Using different hash functions may reduce the likelihood that a queue corresponding to the same prefix length is full in both Bloom filters 52.

The corresponding one of controllers 74 examines the index value and determines which one of memory banks 76 is needed for the lookup of the prefix (98). In one example, controller 74 determines which memory bank using the first five bits of the hash key (i.e., when there are 32 different memory banks 76 implemented in Bloom filter 52A). Each of controllers 74 then performs a lookup in the appropriate one of memory banks 76 (100). If two controllers 74 attempt to perform a lookup on the same one of memory banks 76 in the same clock cycle, one controller 74 will be prevented from performing the lookup until a later clock cycle, which may increase the length of the corresponding queue 70. After the prefix is looked up in memory banks 76, Bloom filter 52A sends the result of the lookup to hash controller 54 (102) and a message to prefix lookup module 50 indicating that the lookup is complete. Prefix lookup module 50 increments the corresponding credit counter in response to receiving the message from Bloom filter 52A (104).

Once hash controller 54 has received a lookup result for each of the prefixes generated from the key information and for each of the Bloom filters 52, hash controller 54 determines the longest prefix of the prefixes that were indicated as being found in both Bloom filters 52 (110). If either Bloom filter lookup result for a prefix indicates that the prefix was not found in the Bloom filter, the prefix is not in key hash table 56 and hash controller 54 discards the prefix from consideration. Hash controller 54 then performs a lookup on the longest prefix in key hash table 56 (112) and determines whether the longest prefix was found in key hash table 56 (114). If the longest prefix is not be found in key hash table 56 ("NO" branch of 114), hash controller 54 determines whether there are any additional prefixes to lookup in key hash table 56 (116). If there are additional prefixes to lookup ("YES" branch of 116), has controller 54 determines the next longest prefix that was indicated as being found in both Bloom filters 52 (118) and performs a lookup in key hash table 56 using the next longest prefix (112) to determine if the next longest prefix is found in key hash table 56 (114). Controller 54 continues determining the next longest prefix (118) and performing a lookup in key hash table 56 (112) until the prefix is found in key hash table 56 ("YES" branch of 114) or until all possible prefixes are looked up in key hash table 56 ("NO" branch of 116). Controller 54 then outputs the results of the lookup to data plane 34 (120).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, (e.g., non-transitory media) and not signals, carrier waves, or other transient media.

Various embodiments of the invention have been described. These and other embodiments are within the scope of the following claims.

The invention claimed is:

1. A method comprising:
   receiving, by a computing device, policy configuration information;
   determining, with a prefix lookup module of the computing device, whether a first queue of a first Bloom filter of the computing device is full;
   responsive to determining that the first queue is full, sending, from the prefix lookup module to a hash controller of the computing device, a first Bloom filter lookup result for a prefix without sending a first Bloom filter lookup request for the prefix to the first Bloom filter, wherein the first Bloom filter lookup result provides an indication that the prefix is stored in the first Bloom filter as if the prefix was found in the first Bloom filter; and
   responsive to the first Bloom filter lookup result indicating that the prefix is stored in the first Bloom filter, performing a lookup with the hash controller on the prefix in a hash table.

2. The method of claim 1, further comprising:
   receiving, by the prefix lookup module of the computing device, key information;
   generating, by the prefix lookup module, a set of prefixes using the key information, wherein each of the set of prefixes includes at least a portion of the key information, wherein each of the set of prefixes has a different length, and wherein the prefix is one of the set of prefixes.

3. The method of claim 1, further comprising:
determining, with the prefix lookup module, whether a second queue of a second Bloom filter is full.

4. The method of claim 3, further comprising:
responsive to determining that the first queue is full and determining that the second queue is not full, sending the first Bloom filter lookup request for the prefix to the first Bloom filter after the prefix length module determines that the first queue is not full.

5. The method of claim 3, further comprising:
responsive to determining that the first queue is full and determining that the second queue is not full, sending a request to lookup the prefix in the second Bloom filter after the prefix length module determines that the first queue is not full.

6. The method of claim 3, further comprising:
responsive to determining that the first queue is full and determining that the second queue is not full:
sending, from the prefix lookup module to the hash controller, the first Bloom filter lookup result for the prefix without sending the first Bloom filter lookup request for the prefix to the first Bloom filter, wherein the first Bloom filter lookup result indicates that the prefix is stored in the first Bloom filter; and
sending, from the prefix lookup module, a second Bloom filter lookup request for the prefix to the second Bloom filter.

7. The method of claim 3, further comprising:
responsive to determining that the first queue is full and determining that the second queue is full:
sending the first Bloom filter lookup request for the prefix to the first Bloom filter after the prefix lookup module determines that the first queue is not full and determines that the second queue is not full; and
sending the second Bloom filter lookup request for the prefix to the second Bloom filter after the prefix lookup module determines that the first queue is not full and determines that the second queue is not full.

8. The method of claim 3, further comprising:
responsive to determining that the first queue is full and determining that the second queue is full:
sending, from the prefix lookup module to the hash controller, the first Bloom filter lookup result for the prefix without sending the first Bloom filter lookup request for the prefix to the first Bloom filter, wherein the first Bloom filter lookup result indicates that the prefix is stored in the first Bloom filter; and
sending, from the prefix lookup module to the hash controller, the second Bloom filter lookup result for the prefix without sending the second Bloom filter lookup request for the prefix to the second Bloom filter, wherein the second Bloom filter lookup result indicates that the prefix is stored in the second Bloom filter.

9. The method of claim 2, wherein the prefix has a first length, the method further comprising:
identifying a subset of the set of prefixes having lengths different than the first length;
sending, from the prefix lookup module to the first Bloom filter, a request to perform a lookup in the first Bloom filter on each prefix in the subset of prefixes;
performing a lookup in a data structure of the first Bloom filter on each prefix in the subset of prefixes; and
sending, from the Bloom filter to the hash controller, a Bloom filter lookup result for each prefix in the subset of prefixes, wherein the Bloom filter lookup result indicates whether the respective prefix was found in the first Bloom filter.

10. The method of claim 9, wherein performing the lookup with the hash controller in the hash table comprises:
identifying a second subset of the set of prefixes based on the Bloom filter lookup results, wherein each prefix in the second subset of prefixes was found in the first Bloom filter;
determining, by the hash controller, a longest prefix in the second subset of prefixes; and
performing a lookup with the hash controller in the hash table on the longest prefix to obtain a hash table lookup result.

11. The method of claim 10, wherein, when the hash table lookup result indicates that the longest prefix is not found in the hash table, performing the lookup with the hash controller in the hash table further comprises:
determining a next longest prefix in the second subset of prefixes; and
performing another lookup with the hash controller in the hash table on the next longest prefix.

12. A computing device comprising:
a first Bloom filter implemented in hardware comprising a first set of queues;
a hash controller;
a hash table; and
a prefix lookup module configured to receive policy configuration information, determine whether a first queue of the first set of queues is full, and responsive to determining that the first queue is full, send, to the hash controller, a first Bloom filter lookup result for a prefix without sending a first Bloom filter lookup request for the prefix to the first Bloom filter, wherein the first Bloom filter lookup result provides an indication that the prefix is stored in the first Bloom filter as if the prefix was found in the first Bloom filter,
wherein the hash controller is configured to perform a lookup in the hash table on a prefix indicated as being stored in the first Bloom filter.

13. The computing device of claim 12, further comprising:
an input interface configured to receive key information
wherein the prefix lookup module is configured to generate a set of prefixes using the key information, wherein each prefix of the set of prefixes includes at least a portion of the key information and has a length equal to the length of prefix that a corresponding queue of the first set of queues is configured to store, and wherein the prefix is one of the set of prefixes.

14. The computing device of claim 12, further comprising:
a second Bloom filter comprising a second set of queues, wherein the prefix lookup module is configured to determine whether at least one queue of the second set of queues is full.

15. The computing device of claim 14, wherein the prefix lookup module is configured to:
when the at least one queue of the first set of queues is full and when none of the second set of queues is full, send, to the first Bloom filter, the first set of Bloom filter lookup requests for the at least one prefix corresponding to the at least one full queue of the first set of queues to the first Bloom filter after the prefix lookup module determines that none of the first set of queues is full.

16. The computing device of claim 14, wherein the prefix lookup module is configured to:
when the at least one queue of the first set of queues is full and when none of the second set of queues is full, send, to the second Bloom filter, a second set of Bloom filter lookup requests for the second set of prefixes to the second Bloom filter after the prefix lookup module determines that none of the first set of queues is full.

17. The computing device of claim 14, wherein the prefix lookup module is configured to:
when the at least one queue of the first set of queues is full and when none of the second set of queues is full:
send, to the hash controller, the first set of Bloom filter lookup results for the at least one prefix corresponding to the at least one full queue of the first set of queues to the first Bloom filter after the prefix lookup module determines that none of the first set of queues is full, wherein the first set of Bloom filter lookup results indicates that the prefix is stored in the first Bloom filter; and
send a second set of Bloom filter lookup requests for the set of prefixes to the second Bloom filter.

18. The computing device of claim 14, wherein the prefix lookup module is configured to:
when the at least one queue of the first set of queues is full and when the at least one queue of the second set of queues is full:
send the first set of Bloom filter lookup requests for the at least one prefix corresponding to the at least one full queue of the first set of queues to the first Bloom filter after the prefix lookup module determines that none of the first set of queues is full and determines that none of the second set of queues is full; and
send a second set of Bloom filter lookup requests for at least one prefix corresponding to the at least one full queue of the second set of queues to the second Bloom filter after the prefix lookup module determines that none of the first set of queues is full and determines that none of the second set of queues is full.

19. The computing device of claim 14, wherein the prefix lookup module is configured to:
when the at least one queue of the first set of queues is full and when the at least one queue of the second set of queues is full:
send, to the hash controller, the first set of Bloom filter lookup results for the at least one prefix corresponding to the at least one full queue of the first set of queues without sending the first set of Bloom filter lookup requests for the at least one prefix corresponding to the at least one full queue of the first set of queues to the first Bloom filter, wherein the first set of Bloom filter lookup results indicates that the prefix is stored in the first Bloom filter; and
send, to the hash controller, a second set of Bloom filter lookup results for the at least one prefix corresponding to the at least one full queue of the second set of queues without sending a second set of Bloom filter lookup requests for the at least one prefix corresponding to the at least one full queue of the second set of queues to the second Bloom filter, wherein the second set of Bloom filter lookup results indicates that the prefix is stored in the second Bloom filter.

20. The computing device of claim 13,
wherein the prefix lookup module is configured to identify a subset of the set of prefixes corresponding to queues in the first set of queues that are not full, and send a request to perform a lookup in the first Bloom filter on each prefix in the subset of prefixes, and
wherein the first Bloom filter is configured to perform a lookup on each prefix in the subset of prefixes, and send a Bloom filter lookup result for each prefix in the subset of prefixes to the hash controller, wherein the Bloom filter lookup result indicates whether the respective prefix was found in the first Bloom filter.

21. The computing device of claim 20,
wherein the first Bloom filter further comprises a set of memory banks configured to store a data structure of the first Bloom filter, and
wherein the first Bloom filter is configured to perform a lookup on each prefix in the subset of prefixes in the set of memory banks, wherein the Bloom filter lookup result for each prefix indicates whether the respective prefix was found in the data structure of the Bloom filter.

22. The computing device of claim 20, wherein the hash controller is configured to:
identify a second subset of the set of prefixes based on the Bloom filter lookup results, wherein each prefix in the second subset of prefixes was found in the first Bloom filter;
determine a longest prefix in the second subset of prefixes; and
perform a lookup in the hash table on the longest prefix to obtain a hash table lookup result.

23. The computing device of claim 20, wherein the hash controller is configured to, when the hash table lookup result indicates that the longest prefix is not found in the hash table:
determine a next longest prefix in the second subset of prefixes; and
perform another lookup with the hash controller in the hash table on the next longest prefix.

24. A non-transitory computer-readable storage medium encoded with instructions for causing one or more programmable processors of a computing device to:
receive policy configuration information;
determine whether a queue of a Bloom filter of the computing device is full;
responsive to determining that the first queue is full, send, to a hash controller of the computing device, a Bloom filter lookup result for a prefix without sending a first Bloom filter lookup request for the prefix to the Bloom filter, wherein the Bloom filter lookup result provides an indication that the prefix is stored in the Bloom filter as if the prefix was found in the first Bloom filter; and
responsive to the Bloom filter lookup result indicating that the prefix is stored in the Bloom filter, perform a lookup on the prefix in a hash table.

* * * * *